April 29, 1947.　　　R. L. DOMASH　　　2,419,766
COMBINATION TABLE AND SEPARABLE SERVICE CABINET
Filed April 13, 1944　　　2 Sheets-Sheet 1

Inventor
Ruth Louise Domash
by Joshua R. H. Potts
her Attorney.

April 29, 1947. R. L. DOMASH 2,419,766
COMBINATION TABLE AND SEPARABLE SERVICE CABINET
Filed April 13, 1944 2 Sheets-Sheet 2
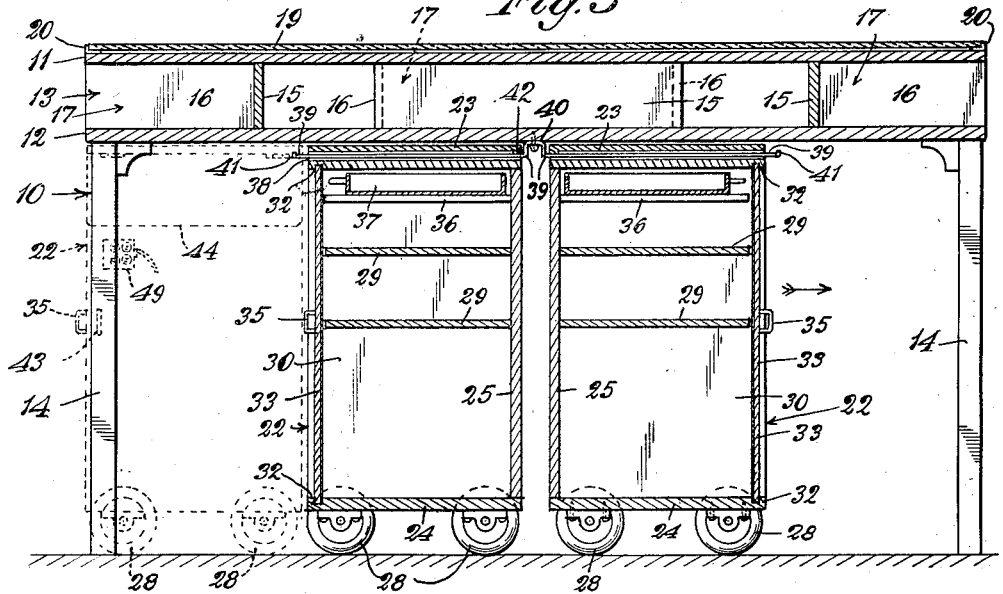
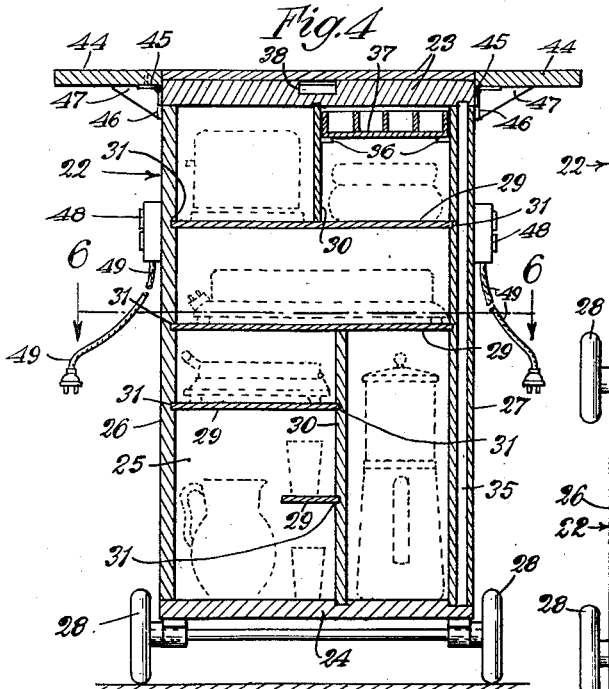
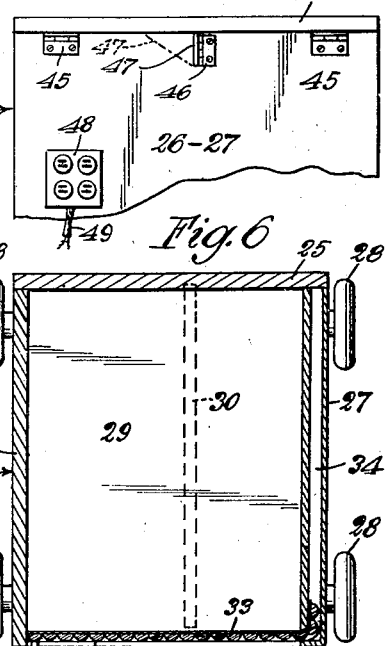
Inventor
Ruth Louise Domash
by Joshua R. H. Potts
her Attorney.

Patented Apr. 29, 1947

2,419,766

UNITED STATES PATENT OFFICE 2,419,766

COMBINATION TABLE AND SEPARABLE SERVICE CABINET

Ruth Louise Domash, Chicago, Ill.

Application April 13, 1944, Serial No. 530,783

3 Claims. (Cl. 312—150)

My invention relates to a combination table and service cabinet, or pantry server, especially for use in a small or one-room apartment, or crowded rooms, especially kitchens or diningrooms, to localize all the dishes and silver, or utensils, and complete service for two or more persons, including cooking utensils or electrical equipment, and appliances, in a small space in convenient reach at the table, thereby facilitating the preparation and serving of meals by eliminating a large percentage of the handling or carrying back and forth of the necessary accessories, service or equipment for serving daily meals, between a table and a pantry or kitchen cabinet, or cupboard, and relieving much of the work, drudgery and complication of preparing and serving meals in the average home, including setting the table, then clearing it and after washing and drying, replacing dishes, and so forth, in a pantry or cabinet which is often quite a distance from the kitchen or dining-room.

The present invention, also, embodies a table, arranged to accommodate two or more persons, with a compartment under the table-top for holding individual service for each person, or for receiving a tray upon which the service is arranged, and, also, to permit the preparation of a good portion of the meal at the table by reason of service cabinets movable beneath the same in convenient position for use of cooking utensils, or electrical appliances therein in preparing a meal, and in which the cabinets serve as working surfaces in preparing the meal and may be increased in size or surface area, as well as provided with electrical outlets in convenient position for connecting appliances by persons at the table.

The present invention, by providing storage space beneath the table-top for accommodating individual service, and cabinets containing all the necessary equipment for preparing a meal, in connection with such other appliances as may be required at a stove, permits a good portion of the meal to be prepared right at the table, and is, therefore, of advantage and especially adapted for use in crowded rooms where there is no wall cabinet or pantry, or which will not accommodate a closet or extra cabinet apart from the table.

The invention, also, embodies a table provided with compartments beneath the top thereof, having a supporting means, surface, shelf, or ledge, for supporting complete service for two or more persons, or serving trays on which the same rest, such as service plate, soup plate, salad plate, cup, saucer, individual salt and pepper shakers, silverware, Pliofilm or Cellophane napkin, and which supporting means will not extend down more than four inches, or so, and, therefore, not lower than the ordinary drop panel or apron usually found on tables, and, thus, will not interfere with the diner's knees.

The invention further embodies a table provided with one or more service cabinets, or pantry servers with compartments for keeping additional dishes, silver, tureens, cooking appliances, and utensils, or kitchen tools, water pitcher, glasses, electrical equipment, appliances, accessories, or cooking utensils in compartments therein, such as a percolator, broiler, toaster, waffle iron, sandwich grill, etc.

The invention, also, embodies a service cabinet arranged at one or more places beneath the table-top or shelf spaced therebeneath, so as to be moved in and out on wheels for convenient access thereto and additional service or appliances stored therein, and to provide additional surface on which to prepare meals in convenient reach, even of a person seated at the table, and more readily accessible than if kept in a pantry or cabinet away from the table.

The cabinets are provided with means to ordinarily prevent their disconnection or total displacement from the table, but to permit such disconnection to move outwardly of the table, if desired, and hinged top or extension leaves for increasing the size of the working surfaces thereof, and electrical outlets connected to the house wiring, and in convenient position for connecting appliances thereto.

Further objects and advantages will appear and be brought out more fully in the following specification, reference being had to the accompanying drawings, in which:

Fig. 3 is a vertical sectional elevation, taken on the section line 3—3 of Fig. 2.

Fig. 4 is an enlarged vertical section of a service cabinet at right-angles to Fig. 3.

Fig. 5 is a fragmentary side elevation of the upper portion of a service cabinet shown in Fig. 4, and Fig. 6 is a horizontal section, taken on the line 6—6 of Fig. 4.

Figure 1:
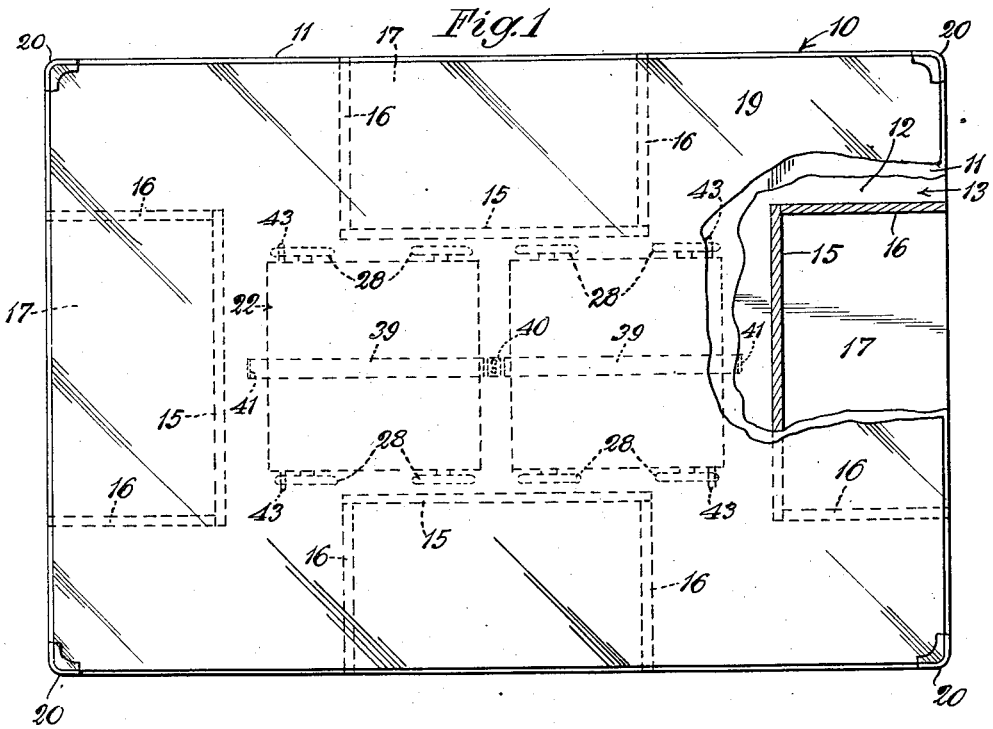
Fig. 1 is a top plan view partly broken away and in section, of a combination table and service cabinet constructed in accordance with my invention.
Figure 2:
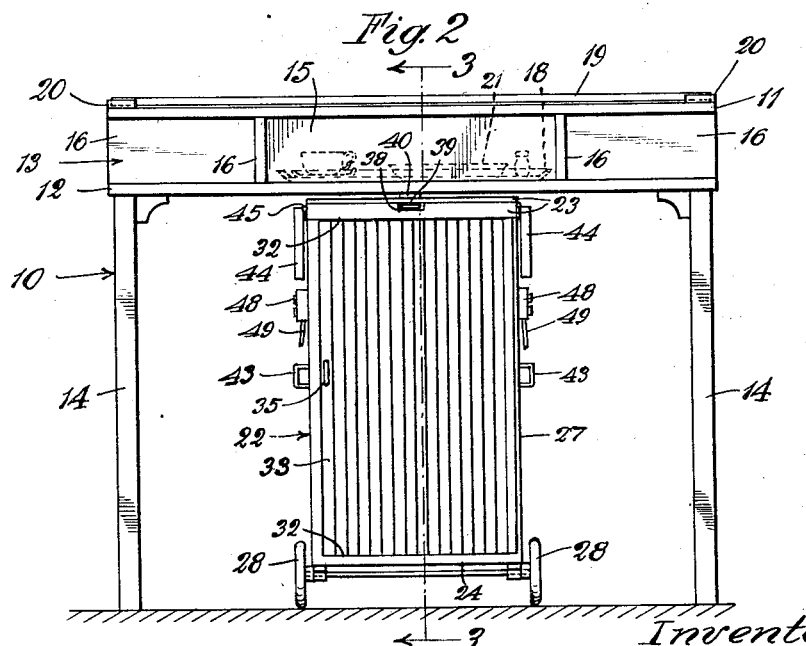
Fig. 2 is a side or end elevation thereof.

Referring to the drawings in detail, 10 designates a table of any suitable material, and may be a dining table, or of dinette or kitchen size, and the size may vary to accommodate two or more persons. This table has a top 11 beneath which a supporting means or horizontal surface in the form of a ledge or shelf 12 may be arranged in spaced parallel relation therebeneath, but not low enough to interfere with the diner's knees, thus providing a space 13 between the top 10 and the shelf 12, having one or more compartments.

The table top structure as above described is supported on legs 14, illustrated as corner legs. Suitably arranged vertical panels or partitions are provided between the shelf 12 and the top 11 to support the latter upon the legs and divide the space 13 into any number of compartments or pockets, and shown as having the vertical panels or partitions 15 spaced from and parallel to the sides or ends of the table and vertical end panels or partitions 16 extending from the ends of the partitions 15 outwardly at right-angles to the edges of the table-top 11, and spaced wall or shelf 12 therebeneath, to form pockets or compartments 17 in which individual service may be supported for each person seated at a side or end of the table.

However, the pockets 17 may be used to contain trays 18 upon which the individual service for each person may rest.

The table may be provided with a glass, or other top 19, which may be transparent, or colored, and may be placed over plastic mats, lace runners, or decorative linens, so that the appearance of the table may be enhanced and changed as desired, thus obviating the need for buying and laundering linen tablecloths, while the glass protects the decorative coverings therebeneath, and of course, provides a surface which is easy to clean, and is heatproof.

The glass top may be held in position by raised corner pieces or L-shaped brackets 20. The individual service plate, etc. is indicated at 21, but by varying the size of the table and the arrangement and number of pockets or compartments 17, the capacity for accommodating persons at the table may be varied.

Movable beneath the shelf 12 are one or more service cabinets or pantry servers 22, which are preferably rectangular in shape and shown provided with a double top 23 of any suitable heatproof material, and shown as comprising two walls arranged, one over the other, the lowermost of which serves as the top of the cabinet, while the upper wall serves as a surface upon which to prepare the meals, or otherwise.

Each cabinet has a bottom wall 24, a back or rear wall 25, a side wall 26, and a hollow, double or slotted side wall 27, and the cabinet may be arranged upon wheels 28, to be conveniently moved in and out, supported by suitable axles in a manner similar to a tea wagon, without marring the floor surface. Suitable rollers or casters are embodied by wheels 28.

The cabinet is provided with any number of suitably arranged horizontal shelves 29, or may be provided with drawers, but is shown divided by vertical partitions 30 into compartments for storing extra dishes, electrical appliances or cooking utensils, and these shelves and partitions are shown removable and arranged in guideways such as grooves 31.

At the top and bottom of the front and one side of each cabinet, top and bottom strips 32 are provided, forming guides for a flexible sliding panel or door 33, similar to a roll top of a desk, and adapted to move into the hollow space 34 provided in the double wall side 27, and the sliding panel or door may have a handle 35 by which it may be manipulated.

The top of the cabinet, or one of the upper compartments, may be provided with guideways or rails 36 for supporting a sliding drawer 37, divided into any suitable number of compartments or trays for accommodating silver, cutlery, or other utensils, or individual silver service, and which are accessible when the sliding door or panel 33 is opened.

The double walled top 23 is provided with a groove or passage 38, shown at the center, and extending parallel to the sides, so as to be confined between the upper and lower portions of the wall to take a flat strip or rod 39, shown having a central bent portion 40 anchored to the shelf 12 and providing stops or shoulders at the downturned ends of the intermediate portion or upturned inner ends of the rods extending outwardly therefrom to limit the movements of the cabinets toward each other and prevent them from coming together.

The outer ends may freely pass through the grooves or passages 38, but are shown as bent or upturned, as indicated at 41, to prevent accidental displacement of the service cabinets from the rods or extremities of the end portions of a single rod or guide member from which the same are formed, by engaging a depending stop 42 at the inner end of the passage 38 while permitting disconnection and displacement of the cabinets from the rod, so that they may be moved outwardly to the edges of the table in the manner indicated in dotted lines in Fig. 3 of the drawings, or be moved to any other convenient place, or outwardly of the table to provide additional surface for supporting articles or food, and in preparing the latter for a meal, as well as for supporting appliances, electrical equipment or cooking utensils, such as heretofore referred to and shown in dotted lines arranged within the various compartments thereof, in Fig. 4.

It will be noted that the passageway 38 is of sufficient depth to permit depression of the upturned end 41 below the stop so that the cabinet may be disconnected from the table. The sides of the cabinets may be provided with handles 43 in convenient position to be grasped for moving the cabinets in the manner described.

The top of the cabinet is provided in each instance with side extension boards or leaves 44, shown hinged at the side edges of the top 23, as at 45, and adapted to swing down toward the sides of the cabinet, but adapted to be held horizontally in alignment with the top 23 by suitable supporting means 46, shown as hinges with horizontally swinging triangular hinge leaves 47, the upper edges of which support the extension boards or leaves 44 so that the top surfaces thereof are in alignment with the top surface of the cabinet when the supporting means is swung away from the side of the cabinet, but permitting the boards to drop down when the supporting means is swung in against the side.

Electrical outlets 48 may be provided on one or more sides, and are shown as having cables 49 which may be provided with plugs for connecting to wall sockets of the house wiring.

From the foregoing description, it is thought that the use and operation of my combination table and service cabinets or pantry servers will be readily understood, especially in connection with the drawings illustrating the same, and, therefore, further description is omitted.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new, and desire to secure by Letters Patent is:

1. A combination table and service cabinet comprising a main table including a top structure and legs, a cabinet having a table top provided with a passageway therethrough, said cabinet being movably arranged beneath said top structure, a strip secured to the under face of the top structure and extending through said passageway and cooperative stops on said strip and said cabinet to limit the outward movement of the cabinet to a position with its face approximately flush with an edge of the top structure, said strip being movable to disengage said stops and thereby permit removal of the cabinet from beneath the top structure.

2. A combination table and service cabinet comprising a main table including a top structure having side and end edges and legs, a cabinet having a table top provided with a passageway therethrough, said cabinet being movably arranged beneath said top structure and having its sides spaced inwardly from the side edges of the top structure and parallel thereto, a strip secured to the underface of the top structure and extending through said passageway and having means to maintain said cabinet in said spaced relation, and cooperating stops on said strip and said cabinet to limit outward movement of the cabinet.

3. A combination table and service cabinet comprising a main table having a top structure consisting of spaced upper and lower portions connected by partitions dividing the space between said portions into compartments, a cabinet mounted on rollers and having a table top spaced slightly below the lower portion of the main table top structure and having a passageway therethrough, a strip secured to the under face of the lower portion of the table top structure and extending through said passageway, and cooperating stops on said strip and said cabinet to limit the outward movement of the cabinet.

RUTH LOUISE DOMASH.

REFERENCES CITED

The following references are of record in the file of this patent:

UNITED STATES PATENTS

| Number | Name | Date |
|---|---|---|
| 2,059,994 | Williams | Nov. 3, 1936 |
| 2,171,084 | Fasce | Aug. 29, 1939 |
| 1,115,899 | Glouser | Nov. 3, 1914 |
| 1,729,491 | Rygl | Sept. 24, 1929 |
| 2,137,717 | Feldman | Nov. 22, 1938 |
| 1,942,856 | Davis | Jan. 9, 1934 |
| 1,112,733 | Umphrey | Oct. 6, 1914 |
| 1,793,506 | Moser | Feb. 24, 1931 |
| 2,210,721 | Jones | Aug. 6, 1940 |